United States Patent
Nanri et al.

(10) Patent No.: US 8,995,753 B2
(45) Date of Patent: Mar. 31, 2015

(54) STEREO DISTANCE MEASUREMENT APPARATUS AND STEREO DISTANCE MEASUREMENT METHOD

(75) Inventors: Takuya Nanri, Kanagawa (JP); Hirofumi Nishimura, Kanagawa (JP); Hisashi Kurokawa, Osaka (JP)

(73) Assignee: Panasonic Corporation, Osaka (JP)

( * ) Notice: Subject to any disclaimer, the term of this patent is extended or adjusted under 35 U.S.C. 154(b) by 173 days.

(21) Appl. No.: 13/811,058

(22) PCT Filed: Jun. 28, 2011

(86) PCT No.: PCT/JP2011/003675
§ 371 (c)(1),
(2), (4) Date: Jan. 18, 2013

(87) PCT Pub. No.: WO2012/011227
PCT Pub. Date: Jan. 26, 2012

(65) Prior Publication Data
US 2013/0114887 A1    May 9, 2013

(30) Foreign Application Priority Data
Jul. 22, 2010   (JP) ................. 2010-165008

(51) Int. Cl.
*G06K 9/00*      (2006.01)
*G01C 11/06*    (2006.01)
(Continued)

(52) U.S. Cl.
CPC .............. *G01C 11/06* (2013.01); *G01C 3/085* (2013.01); *G01C 3/14* (2013.01); *G06T 5/003* (2013.01); *G06T 5/50* (2013.01);
(Continued)

(58) Field of Classification Search
None
See application file for complete search history.

(56) References Cited

U.S. PATENT DOCUMENTS

| 6,373,518 B1 | 4/2002 | Sogawa |
| 2010/0074520 A1 | 3/2010 | Kinoshita |

(Continued)

FOREIGN PATENT DOCUMENTS

| CN | 101685534 A | 3/2010 |
| EP | 0 957 642 A2 | 11/1999 |

(Continued)

OTHER PUBLICATIONS

Extended European Search Report issued in EP Application No. 11 80 9406.9 dated Dec. 16, 2013.

(Continued)

*Primary Examiner* — Aaron W Carter
*Assistant Examiner* — Siamak Harandi
(74) *Attorney, Agent, or Firm* — Pearne & Gordon LLP

(57) ABSTRACT

Provided is a stereo distance measurement apparatus wherein a camera image itself is adjusted to correct the blur, thereby preventing the distance measurement time from being long, while improving the precision of disparity detection. In the apparatus (100), a blur adjusting unit (102) uses a filter to tailor the blur of one of two images used by a disparity measuring unit (103), to the blur of the other which is weaker. A camera image itself is adjusted, whereby the blur can be corrected. Moreover, tailoring the blur of the one image to the blur of the other image which is weaker allows an application of the filter, which is a simple processing, to cause the blurs of the images used in the disparity detection, to coincide with each other. Therefore, the precision of disparity detection can be improved, while the distance measurement can be performed at a high speed.

6 Claims, 15 Drawing Sheets

(51) Int. Cl.
  *G01C 3/08* (2006.01)
  *G01C 3/14* (2006.01)
  *G06T 5/00* (2006.01)
  *G06T 5/50* (2006.01)
  *G01S 11/12* (2006.01)

(52) U.S. Cl.
  CPC ............... *G06T 2207/10012* (2013.01); *G06T 2207/20201* (2013.01); *G01S 11/12* (2013.01)
  USPC ........................................................ 382/154

(56) References Cited

U.S. PATENT DOCUMENTS

2010/0310176 A1* 12/2010 Lin et al. ................. 382/195
2011/0222734 A1* 9/2011 Angot et al. ............. 382/106
2011/0262030 A1* 10/2011 Sahay et al. ............. 382/154

FOREIGN PATENT DOCUMENTS

| JP | 11-325889 A | 11/1999 |
| JP | 2004-037732 A | 2/2004 |
| JP | 2005-024463 A | 1/2005 |
| JP | 2007-166442 A | 6/2007 |
| JP | 2008-096162 A | 4/2008 |
| JP | 2008-233389 A | 10/2008 |
| JP | 2008-241491 A | 10/2008 |
| JP | 2008-216127 A | 9/2009 |
| JP | 2010-002233 A | 1/2010 |

OTHER PUBLICATIONS

English translation of the Search Report for Chinese Application No. 201180035324.3 dated Jun. 5, 2014.
International Search Report for Application No. PCT/JP2011/003675 dated Sep. 6, 2011.

* cited by examiner

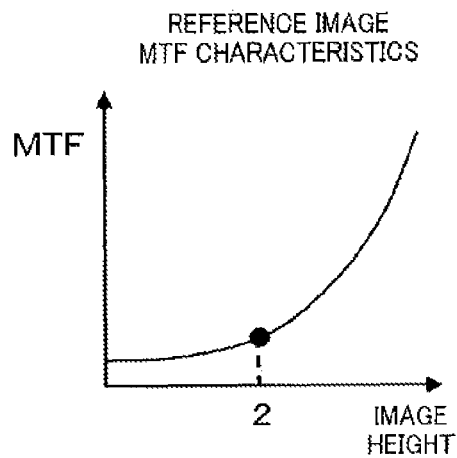
FIG. 4A
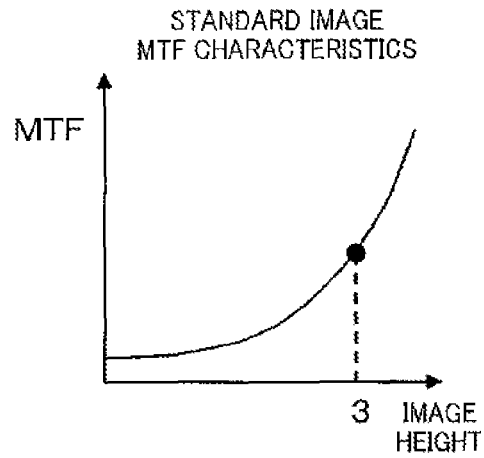
FIG. 4B
| IMAGE HEIGHT OF STANDARD IMAGE [pixel] | IMAGE HEIGHT OF REFERENCE IMAGE [pixel] | | | | |
|---|---|---|---|---|---|
| | 1 | 2 | 3 | ... | D |
| 1 | — | $a_{1,2}(x)$ | $a_{1,3}(x)$ | ... | $a_{1,D}(x)$ |
| 2 | $a_{2,1}(x)$ | — | $a_{2,3}(x)$ | ... | $a_{2,D}(x)$ |
| 3 | $a_{3,1}(x)$ | $a_{3,2}(x)$ | — | ... | $a_{3,D}(x)$ |
| ... | ... | ... | ... | — | ... |
| D | $a_{D,1}(x)$ | $a_{D,2}(x)$ | $a_{D,3}(x)$ | ... | — |
FILTER COEFFICIENT
FIG. 4C

STEREO DISTANCE MEASUREMENT APPARATUS AND STEREO DISTANCE MEASUREMENT METHOD

TECHNICAL FIELD

The claimed invention relates to a stereo ranging apparatus and a method of stereo ranging.

BACKGROUND ART

A stereo ranging apparatus is known for measuring the distance to the target (i.e., imaging target) using two images taken by a stereo camera. The stereo camera has a first form including first and second cameras having parallel optical axes.

A second form including the first and second cameras having non-parallel optical axes (i.e., in the directions apart from each other) is also proposed in order to more widen the entire photographing range of the stereo camera than the above first form (e.g., see Patent Literature 1).

A stereo ranging apparatus disclosed in Patent Literature 1 calculates disparity between two images using an image area in two images that corresponds to an area overlapped in visual fields of both cameras (i.e., overlapped area), and calculates the distance to the target based on this disparity value. A non-overlapped area is used for object detection based on general information on object movement such as an optical flow.

However, in the above second form, a case frequently occurs where image heights distance from the image center corresponding to the principal point of a lens) of the target images projected on the overlapped area greatly differ from each other. The image area is sharp when the image height of the image area is small, while the image area is blurred due to the effect of a spherical aberration of a lens when the image height is large. Thus, the above second form measures the distance using the two image areas included in images taken by respective different cameras and having different "blurs," There is a problem that ranging based on the two images having different "blurs," deteriorates the accuracy of ranging.

In this case, "blur" represents the degree at which the light reflected from a single point of an object or the like expands over the spatial area without being converged into a single point by a lens. Also in the case of an image, "blur" represents the degree of the state at which an image is unclearly taken when a ray of light reflected from the single point expands larger than the size of an image sensor of a CCD or the like.

A process for calibrating relative positions of a plurality of lenses or relative positions of a plurality of cameras forming a stereo camera is generally known. The former is a distortion correction process for correcting lens distortion, and the latter is a geometry correction process for collimating optical axes of both cameras (see, Patent Literature 2). However, these processes do not correct the blur due to the spherical aberration.

Patent Literature 3 discloses a method of correcting blur using a mechanism for adjusting focus of a lens.

CITATION LIST

Patent Literature

PTL 1
Japanese Patent Application Laid-Open No. 2005-24463
PTL 2
Japanese Patent Application Laid-open No. 11-325889
PTL 3
Japanese Patent Application Laid-Open No. 2008-241.491

SUMMARY OF INVENTION

Technical Problem

However, there is a problem that a focus adjusting mechanism is required to be mounted on a stereo ranging apparatus to which a conventional method of correcting blur is applied, which makes the apparatus complexed. In addition, since the conventional method of correcting blur uniformly performs blur correction on the entire images taken by two cameras (hereinafter, referred to as "camera images"), physically controlling the focus adjusting mechanism is necessary every time the blur is varied due to the change of the target positions in the camera images. Thus, this causes frequent preprocessing of a ranging process, and then requires longer time for the ranging process.

The claimed invention has been implemented taking into account the problems described above, and it is an object of the claimed invention to provide a stereo ranging apparatus and method of stereo ranging that can involve blur correction through adjustment of camera images and thus prevent extension of the time for the ranging process while improving the accuracy of disparity detection.

Solution to Problem

According to an aspect of the claimed invention, a stereo ranging apparatus includes: a disparity measuring section that measures disparity using a first image and a second image; a calculation section that calculates the distance to a target based on the measured disparity; and an adjusting section that adjusts the blur of sharper one of the first image and second image used by the disparity measuring section to the blur of the other image that is more blurred, using a blur adjusting filter.

According to an aspect of the claimed invention, a method of stereo ranging that measures disparity using a stereo image that includes a first image and a second image, and calculates the distance to a target based on the measured disparity, the method includes the step of adjusting the blur of sharper one of the first image and second image used for the measuring of disparity to the blur of the other image that is more blurred, using a blur adjusting filter.

Advantageous Effects of Invention

According to the claimed invention, it is possible to provide a stereo ranging apparatus and method of stereo ranging that can involve blur correction through adjustment of camera images and thus prevent extension of the time for the ranging process while improving the accuracy of disparity detection, even when the effect of the blur due to spherical aberration causes difference between blurs of images forming a stereo image.

BRIEF DESCRIPTION OF DRAWINGS

FIG. 4 explains blur adjusting filter coefficients;

DESCRIPTION OF EMBODIMENTS

Figure 1:
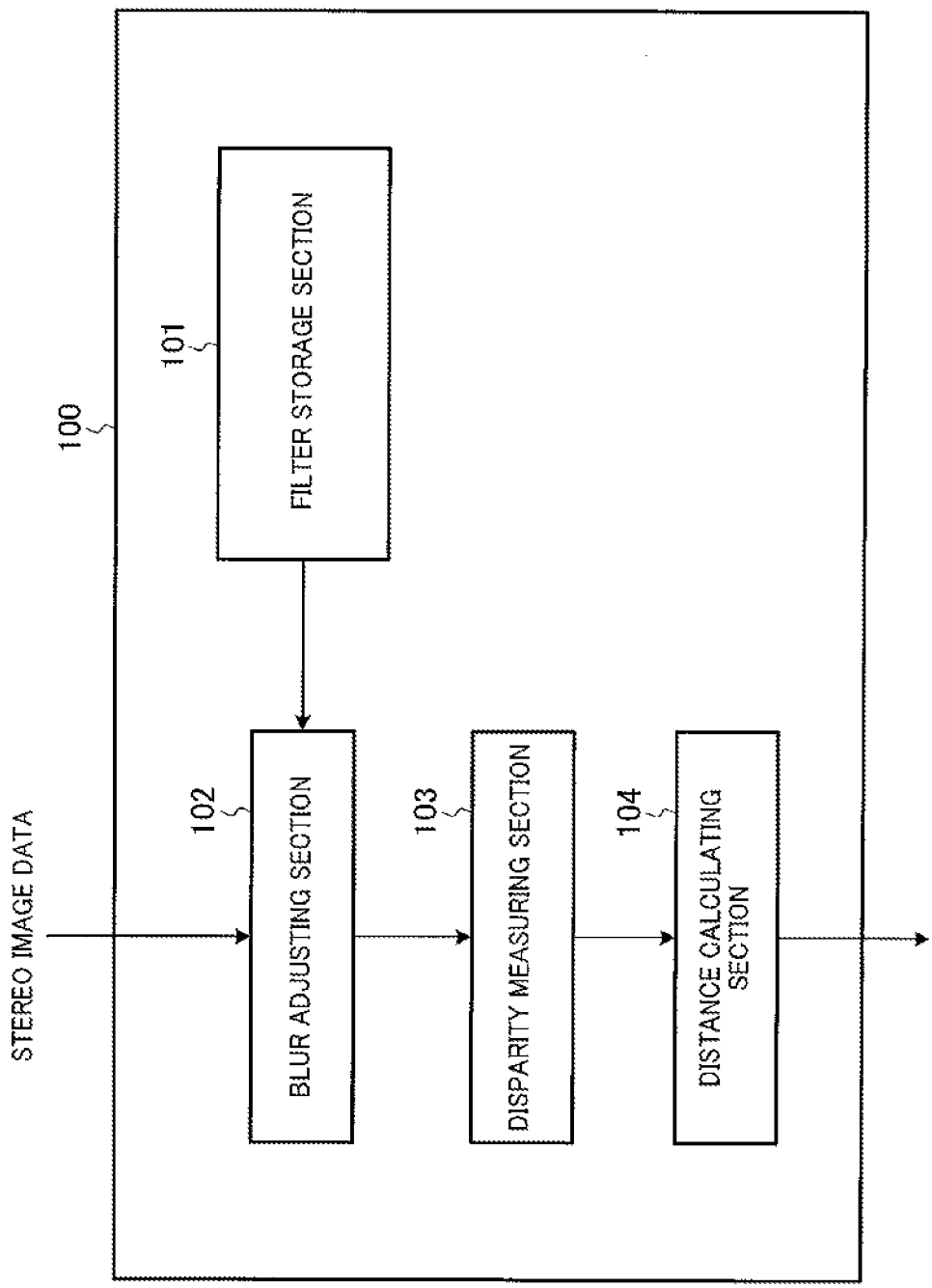
FIG. 1 is a block diagram showing a configuration of a stereo ranging apparatus according to Embodiment 1 of the claimed invention.

Hereinafter, embodiments of the claimed invention will be explained in detail with reference to the accompanying drawings. In the embodiments, the same components are denoted by the same reference numerals and their duplicated explanations will be omitted.

[Embodiment 1]
[Configuration of Stereo Ranging Apparatus 100]

FIG. 1 is a block diagram showing a configuration of stereo ranging apparatus 100 according to Embodiment 1 of the claimed invention. Stereo ranging apparatus 100 calculates the target distance between stereo ranging apparatus 100 and an object to be measured (hereinafter, referred to as "target") using: the first target image that is a partial image included in the first image taken by the first imaging optical system (hereinafter, referred to as "first camera") and on which the target is taken; and the second target image that is a partial image included in the second image taken by the second imaging optical system (hereinafter, referred to as "second camera") and on which the target is taken.

Hereinafter, the first camera represents a right camera and the first image represents a standard image, and the second camera represents a left camera and the second image represents a reference image. An imaging section including the first and the second cameras acquires the first and the second images and outputs the images to stereo ranging apparatus 100.

In FIG. 1, stereo ranging apparatus 100 includes filter storage section 101, blur adjusting section 102, disparity measuring section 103, and distance calculating section 104.

Filter storage section 101 stores a correspondence of blur adjusting filter coefficients and candidate combinations of the image heights in the standard image and in the reference image. This correspondence will be explained hereinafter in detail.

Blur adjusting section 102 uses a blur adjusting filter to adjust the blur of sharper one (i.e., high quality) of respective partial images of the standard image and the reference image used for measuring disparity by disparity measuring section 103 to the blur of the other image that is more blurred (i.e., low quality).

Specifically, blur adjusting section 102 receives, as input, stereo image data including the standard image and the reference image. Blur adjusting section 102 acquires a combination of the image height of the first target image in the standard image and the image height of the second target image with the same target as the first target image, in the reference image, and the blur adjusting filter coefficient associated by a correspondence table. This blur adjusting filter coefficient is used in a blue adjusting process.

Figure 2:
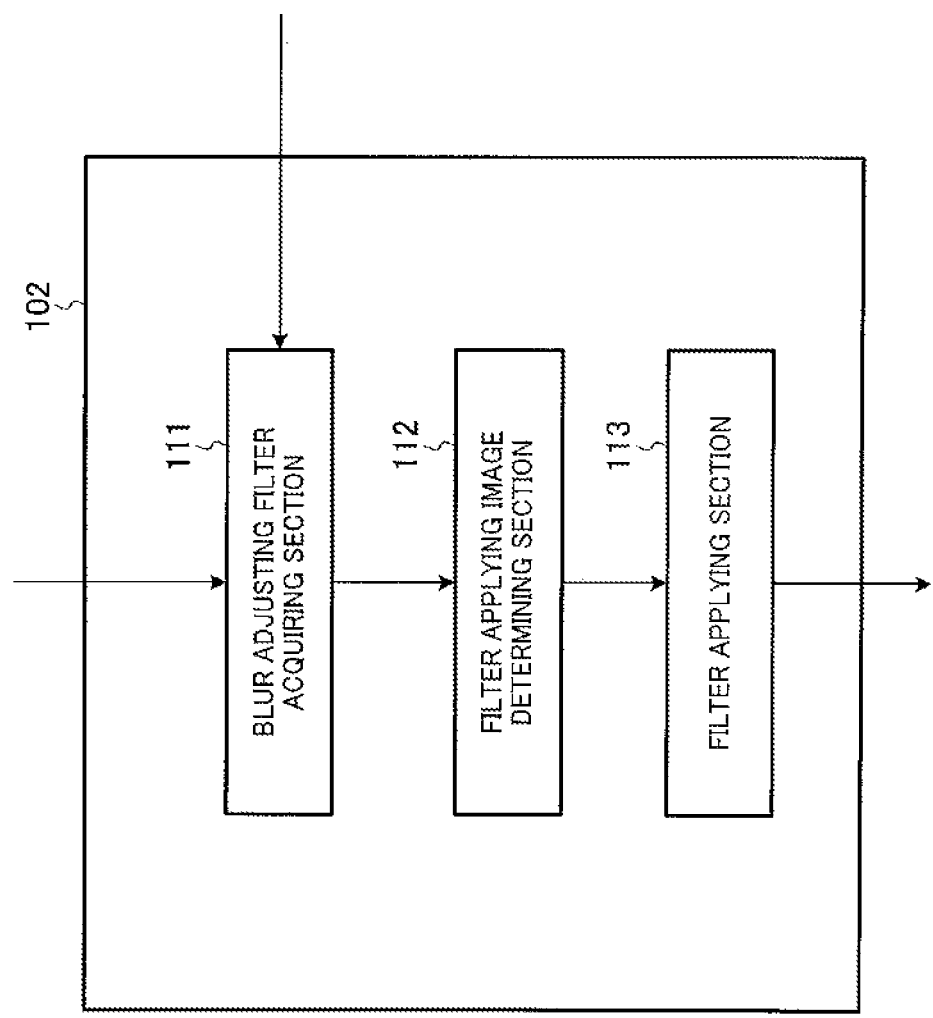
FIG. 2 is a block diagram showing a configuration of a blur adjusting section.

Specifically, as shown in FIG. 2, blur adjusting section 102 includes blur adjusting filter acquiring section 111, filter applying image determining section 112, and filter applying section 113.

Blur adjusting filter acquiring section 111 acquires the combination of the image height of the standard image and the image height of the reference image, and the blur adjusting filter coefficient associated by the correspondence table.

Filter applying image determining section 112 determines whether the blur adjusting filter coefficient acquired by blur adjusting filter acquiring section 111 is applied to the standard image (i.e., brightness signals of the standard image) or the reference image (i.e., brightness signals of the reference image).

Filter applying section 113 applies the blur adjusting filter coefficient acquired by blur adjusting filter acquiring section 111 to the image selected by filter applying image determining section 112.

Disparity measuring section 103 measures the disparity using the standard image and the reference image. The disparity means the difference in the direction of x-axis of the image (hereinafter, referred to as "image x-axis") between the position of the standard point of the disparity (hereinafter, referred to as "disparity standard point") in the standard image and the position of a point, which corresponds to the disparity standard point, in the reference image (hereinafter, referred to as "corresponding point"). The present embodiment explains that both cameras of a stereo camera are provided side by side, and thus the disparity represents the difference in the x-axis direction. Alternatively, the disparity represents the difference in the y-axis direction when the both cameras of the stereo camera are provided vertically.

Specifically, disparity measuring section 103 measures the disparity in two stages, i.e., a pixel disparity measuring process and a sub-pixel disparity measuring process. The pixel disparity measuring process measures the disparity of the pixel accuracy (i.e., integer accuracy), and the sub-pixel disparity measuring process measures the disparity of the sub-pixel accuracy (i.e., decimal accuracy). In the pixel disparity measuring process, disparity measuring section 103 firstly provides the disparity standard point in the standard image and a search area, which corresponds to the disparity standard point, in the reference image. Disparity measuring section 103 sequentially compares image brightness of the disparity standard point and a plurality of search points in the search area, and selects the search point having the least dissimilarity to the disparity standard point as a corresponding point (i.e., reference point). In addition, the sub-pixel disparity measuring process calculates the disparity under decimal point between the disparity standard point and the reference point, which is selected in the pixel disparity measuring process, using the image brightness.

Distance calculating section 104 calculates the distance to the target based on the disparity measured by disparity measuring section 103.

[Operation of Stereo Ranging Apparatus 100]

Figure 3:
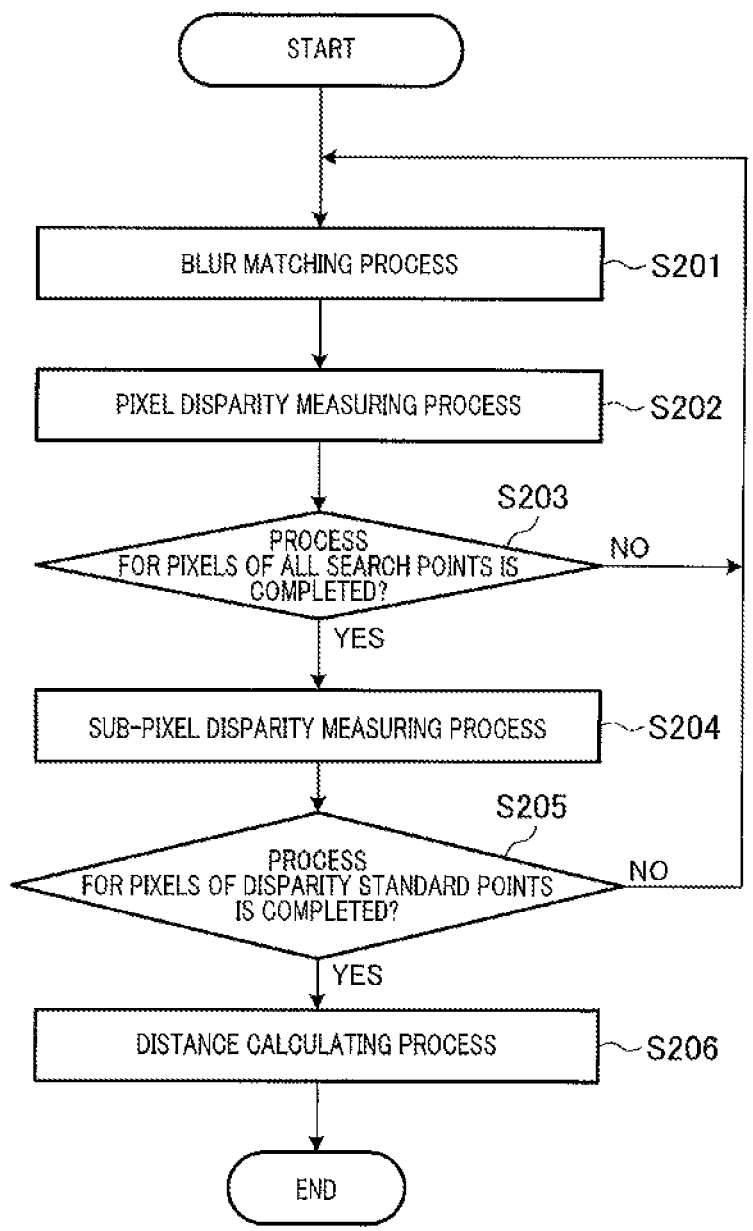
FIG. 3 is a flowchart to explain the operation of the stereo ranging apparatus.

The operation of stereo ranging apparatus TOO with the above configuration will be explained. FIG. 3 is a flowchart to explain the operation of stereo ranging apparatus 100.

Blur adjusting section 102 acquires stereo image data from an imaging section (not shown). The stereo image data means a pair of image data that is taken at the same time by a stereo camera with two lenses side by side (i.e., standard image data and reference image data), in the stereo image data, the horizontal directions of the standard image and reference image are paralleled in the base length direction of the stereo camera. The paralleled state means that an epipolar line in the reference image (i.e., line generated by projecting the optical axis of one camera to the image of the other camera) is parallel to the image x-axis.

In step S201, blur adjusting section 102 performs an adjustment process to match the blurs of the standard image and reference image, which are used for disparity measurement by disparity measuring section 103, using a blur adjusting filter coefficient. In other words, blur adjusting section 102 matches the blur of the standard point of the standard image and the blur of the search point of the reference image. In this case, the blur is adjusted in pixels.

Blur adjusting filter coefficients are stored in filter storage section 101. FIG. 4 explains the blur adjusting filter coefficients. As shown in FIG. 4, the blur of the standard image depends on modulation transfer function (MTF) characteristics (i.e., absolute value of optical transfer function (OTF)) determined based on the image height of the standard image used for stereo distance measurement (i.e., distance from the principal point of the image) (see, FIG. 4B). The same is true for the blur of the reference image (see, FIG. 4A). Thus, when the image heights of the standard image and reference image that are used for stereo distance measurement is designated, the filter coefficient for matching the blurs of the standard image and reference image is uniquely defined.

A correspondence table of blur adjusting filter coefficients and candidate combinations of the image heights of the standard image and the reference image shown in FIG. 4C are stored in filter storage section 101. For example, the filter coefficient corresponding to the combination of the image height=2 in FIG. 4A and the image height=3 in FIG. 4B is hold in matrix area (3, 2) in FIG. 4C.

Figure 5:
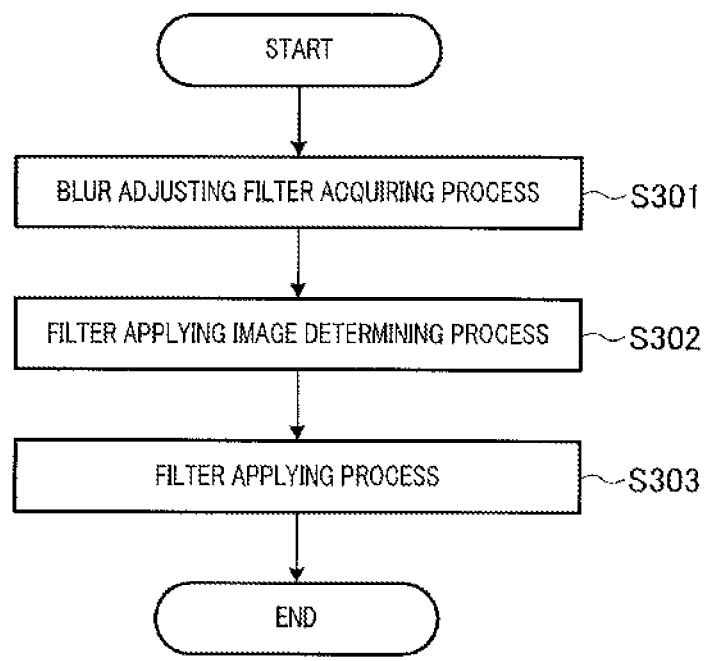
FIG. 5 is a flowchart to explain a blur matching process.

FIG. 5 is a flowchart to explain a blur matching process.

Blur adjusting filter acquiring section. 111 determines the standard point of the standard image and the search area and initial search point, which correspond to the standard point, in the reference image. A search point is sequentially changed to another search point in the search area every time the step returns from step S203 to step S201. The standard point is also sequentially changed to another standard point in the standard image every time the step returns from step S205 to step S201.

In step S301, blur adjusting filter acquiring section 111 acquires a combination of the image heights of the standard point and reference point, and a blur adjusting filter coefficient associated by a correspondence table.

Specifically, blur adjusting filter acquiring section 111 calculates the image height from the position of the disparity standard point (i.e., length from the image center to the disparity standard point in the standard image), and the image height from the search point (i.e., length from the image center to the search point in the reference image). Blur adjusting filter acquiring section 111 acquires the blur adjusting filter coefficient from the correspondence table by using the image heights of the disparity standard point and search point as indices.

in step 302, filter applying image determining section 112 determines whether the blur adjusting filter coefficient acquired by blur adjusting filter acquiring section 111 is applied to the standard point (i.e., brightness signals of the standard point) or the search point brightness signals of the search point). This determination is based on the positions of the disparity standard point and search point.

Specifically, filter applying image determining section 112 compares the image heights of the disparity standard point and search point, and selects an image with the smaller image height value, as an image for applying the filter coefficient.

In step S303, filter applying section 113 applies the blur adjusting filter coefficient acquired by blur adjusting filter acquiring section 111 to the image selected by filter applying image determining section 112. This application process can be represented by following equation 1.

(Equation 1)

$$J(x) = \sum_{u=-M}^{M} I(x+u) \cdot a_{i,j}(u), \text{ where } (0 < x < N-1) \quad [1]$$

In equation 1, J(x) represents brightness signals after the blur is corrected, I(x) represents the brightness signals, and $a_{i,j}(u)$ represents the brightness coefficients. "N" represents the number of pixels in the extracted image area, "u" represents the number of dimensions of the blur adjusting filter coefficient, and "i" represents the image height value of the disparity standard point, and "j" represents the image height of the reference point. In addition, "x" represents a possible value (0<x<N−1) on the image x-axis (i.e., horizontal axis) corresponding to the extracted image area, and "M" represents a value that defines a possible range of "u." "M" and "N" satisfy the relation of "2M+1≤N."

The present embodiment describes that the blur adjusting filter coefficient has an one-dimensional array in the image x-axis direction. Alternatively, a two-dimensional array of the image x-axis direction (i.e., horizontal direction) and the y-axis direction of the image (i.e., vertical direction) may be possible. Consequently, the blur in the y-axis direction can be adjusted.

In step S202 of FIG. 3, disparity measuring section 103 performs a pixel disparity measuring process using the standard point and the search point with adjusted blurs. Specifically, disparity measuring section 103 calculates the dissimilarities between the brightness signals of the standard point and search point, and holds the least dissimilarity among all dissimilarities on the plurality of calculated search points and the search point with the acquired dissimilarity. The pixel disparity measuring process will be explained hereinafter with reference to drawings.

In step S203, disparity measuring section 103 determines whether or not processes of steps S201 and S202 are performed on all the search points in the search range. The process returns to step S201 when any search point remains (step S203: NO) and moves to step S204 when no search point remains (step S203: YES). In this case, the search point held to the last in step S202, i.e., the search point having the least dissimilarity, is selected as the reference point.

in step S204, disparity measuring section 103 calculates the disparity under decimal point between the disparity standard point and the reference point, which is selected in the pixel disparity measuring process, using image brightness.

In step S205, disparity measuring section 103 determines whether or not processes of steps S201 to S204 are performed on all the standard points in the standard image (step S205).

Distance calculating section 104 calculates the distance to the target based on the disparity measured by disparity measuring section 103 when the processes of steps S201 to S204 are completed on all the standard points in the standard image (step S205:YES).

Specifically, distance calculating section 104 calculates the distance with the following equation 2.

[2]

(distance)=(base length)×(focal length)/(pixel pitch)/(disparity)  (Equation 2)

where the base length represents the distance between lens focuses in the stereo camera, the focal length represents a parameter determined based on the specifications of the lens, and the pixel pitch represents the size of an image sensor.

As described above, the blur matching process and the pixel disparity measuring process are repeated through scanning of the search point for the entire search area, and the sub-pixel disparity measuring process is repeated through scanning of the disparity standard point for the entire standard image. By this means, the disparity of the entire standard image is estimated, and a two-dimensional array of the disparity of the entire image range is estimated. The scanning of the disparity standard point is not required for the entire image and may be performed only in a road area. In other words, any area can be scanned for the disparity standard point.

<Explanation of Blur Matching Process>

A blur matching process will now be explained with reference to FIG. 6.

Figure 6A:
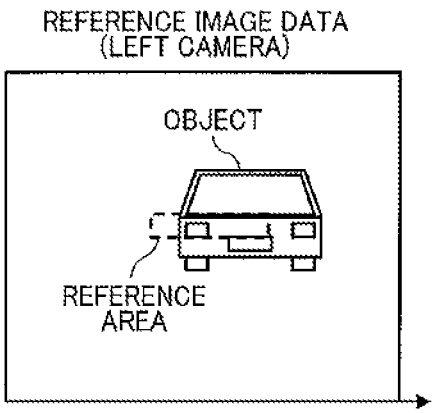
FIG. 6 explains the blur matching process.
Figure 6B:
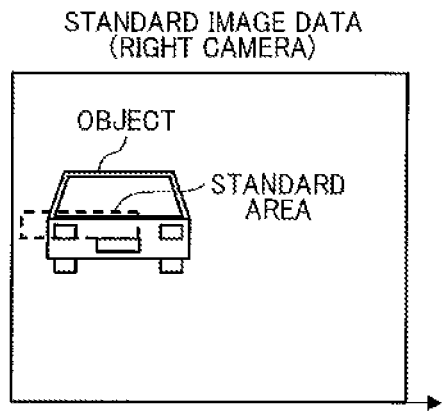

Blur adjusting section 102 receives, as input, a stereo image, which includes a standard image (see, FIG. 6B) and a reference image (see, FIG. 6A).

Figure 6C:
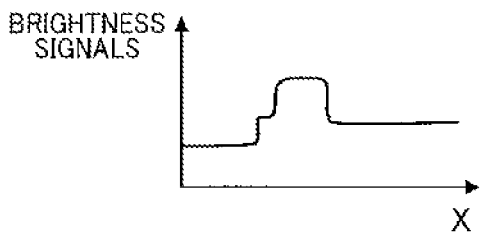
Figure 6D:
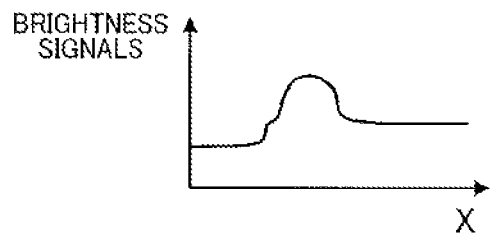
Figure 6E:
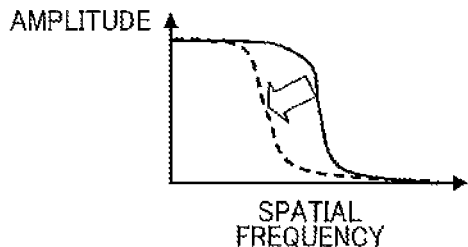
Figure 6F:
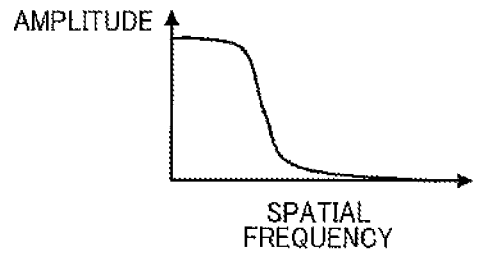
Figure 6G:
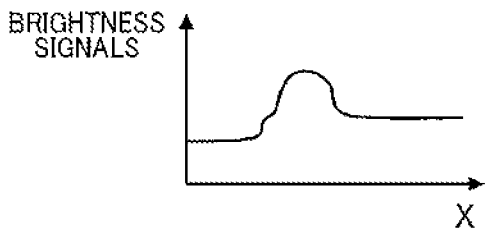

FIG. 6C and FIG. 6D show an example of brightness signals in a reference area (i.e., target area of a stereo matching process in the reference image) and that of brightness signals in a standard area (i.e., target area of a stereo matching process in the standard image), respectively. FIG. 6E and FIG. 6F show amplitude characteristics of the brightness signals in the reference area and amplitude characteristics of the brightness signals in the standard area, respectively. FIG. 6G shows the amplitude characteristics of brightness signals in the reference area with the adjusted blur. In FIG. 6C, FIG. 6D, and FIG. 6G, the horizontal axis represents the image x-axis and the vertical axis represents the brightness value.

The brightness signals of the reference image shown in FIG. 6C is less rounded than the brightness signals of the standard image shown in FIG. 6D. In other words, the amplitude characteristics of FIG. 6E shows higher-frequency side components than those of FIG. 6F.

In other words, this state indicates that the blur differs between the standard area and the reference area. When the disparity is detected using such a standard area and reference area, the standard deviation of the disparity increases and then the accuracy is deteriorated. This is because, when the stereo matching process is performed on signals having different blurs, signals without amplitude components in certain spatial frequency and signals with amplitude components in the spatial frequency are matched, and thus the accuracy of disparity detection is deteriorated.

Compared to this, detecting the disparity after adjusting the blur of the reference area that is less blurred to the blur of the standard area that is more blurred using a filter coefficient improves the accuracy of disparity detection. This is because matching the blurs of both areas prevents deterioration of the standard deviation of disparity.

<Explanation of Disparity>

Figure 7A:
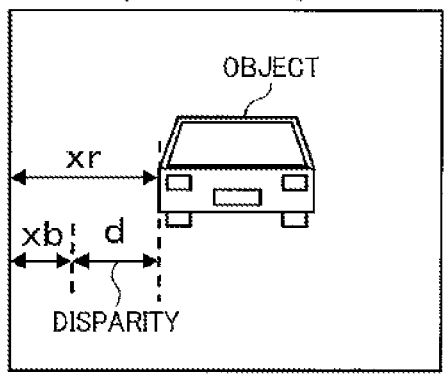
FIG. 7 explains disparity.
Figure 7B:
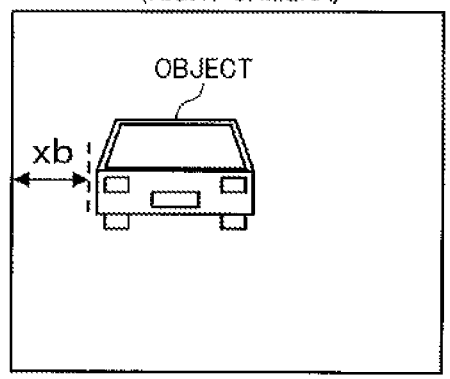

Disparity will now be explained. FIG. 7 explains the disparity. FIG. 7 shows stereo images when an object is present in front of a camera. FIG. 7A shows a reference image, and FIG. 7B shows a standard image.

The position of an object image in the reference image is displaced to the right compared to the position of an object image in the standard image. This displacement represents the disparity, which is varied depending on the distance between the camera and the object.

Specifically, disparity "d." in the left end of the object can be calculated from equation "xr−xb" where "xb" represents the coordinate of the left ends to be measured in the standard image and "xr" represents the coordinate of the left ends of a target to be measured in the reference image.

<Explanation of Disparity Measuring Process>

Figures 8A, 8B:
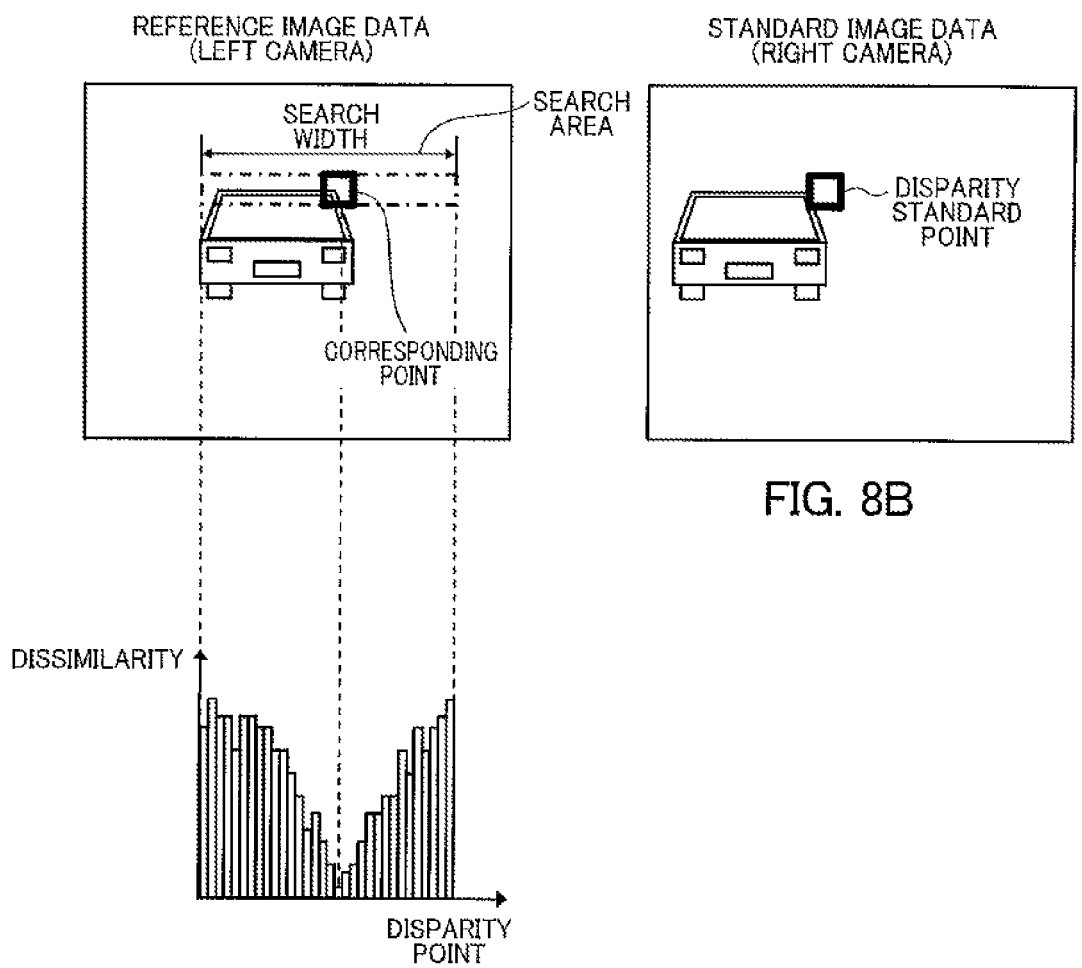
FIG. 8 explains a pixel disparity measuring process.

FIG. 8 explains a pixel disparity measuring process. FIG. 8A shows a reference image with a search area and a corresponding point, and FIG. 8B shows a standard image with a standard point. The search area in FIG. 8A is provided corresponding to the standard point in FIG. 8B.

In the pixel disparity measuring process, dissimilarities between the brightness of the standard point and all the respective search points in the search area are calculated, and then the search point having the smallest dissimilarity is selected as the corresponding point. As shown in the diagram below of FIG. 8A, the dissimilarities between the brightness of the standard point and all the respective search points in the search area are represented as a one-dimensional distribution having the horizontal axis as disparity and the vertical axis as the dissimilarity of the brightness.

The dissimilarities of the brightness are determined using, for example, the sum of absolute differences (SAD) of the image brightness between a small area of 8×8 pixels with the disparity standard point as its center and respective small areas of 8×8 pixels with each point in the search area as its center. The position of the corresponding point having the smallest dissimilarity represents the disparity at the disparity standard point.

Although the present embodiment has explained that the small area of 8×8 pixels is used for calculating the dissimilarities, the claimed invention is not limited to this. In other words, a rectangular area of an arbitrary size can be used. Although the present embodiment has explained that the image brightness is used for calculating the dissimilarities, the claimed invention is not limited to this. In addition, the preprocessing of the image may involve application of an image filter, such as a Laplacian filter or a LoG filter. The sum of squared difference (SSD) or the like may also be used for calculating the dissimilarities. In other words, an arbitrary dissimilarity that has the smallest value when the two small areas are perfectly matched can be used. The normalized cross-correlation (NCC) or the like may be also used for calculating the dissimilarities. In other words, an index of similarity that has the largest value when the two small areas are perfectly matched can be used by reversing positive and negative values.

In a sub-pixel disparity measuring process, the difference of sub-pixels is calculated from the phase difference of frequency characteristics using the image brightness of a small area of image x-axis of 31 pixels with the disparity standard point as its center, and the image brightness of a small area of image x-axis of 31 pixels with the corresponding point as its center.

Although the present embodiment has explained the small area for calculating the sub-pixel disparity as the image x-axis of 31 pixels, the claimed invention is not limited to this. In other words, a rectangular area of an arbitrary size can be used. Although the present embodiment has explained that the image brightness is used for calculating the dissimilarity, the claimed invention is not limited to this. In addition, the preprocessing of the image may involve application of an image filter, such as a Laplacian filter or a LoG filter. A variety of matching means based on frequency characteristics, such as phase only correlation (POC) or the like can be used for calculating the sub-pixel disparity. In addition, a variety of methods for estimating the minimum value, such as an equi-angular line fitting, a parabola fitting or the like can be used for calculating the sub-pixel disparity. In this case, the dissimilarities of the image brightness used for the pixel disparity measuring process are used.

Although the present embodiment has explained that the stereo camera is a camera provided with two lenses side by side, the claimed invention is not limited to this, and two cameras can be alternatively used. Although the present embodiment has explained that the stereo camera is the camera provided with two lenses side by side, the claimed invention is not limited to this, and the stereo camera provided with two lenses in an arbitrary position, such as a vertical state, is applicable.

According to the present embodiment, in stereo ranging apparatus 100, blur adjusting section 102 matches the blur of sharper one of respective partial images of the standard image and reference image used for measuring the disparity by disparity measuring section 103 to the blur of the other image that is more blurred, using the blur adjusting filter.

By this means, the blur can be corrected through adjustment of the camera image itself. A simple process to apply a filter by matching the blur of a sharper image to the blur of the other image that is more blurred can match the blur between images used for disparity detection. Thus, the accuracy of the disparity detection can be improved and a ranging process can be accelerated.

Disparity measuring section 103 measures the disparity in two stages, i.e., the pixel disparity measuring process and the sub-pixel disparity measuring process, and blur adjusting section 102 adjusts the blur in pixels in the preceding stage of the pixel disparity measuring process.

Although the present embodiment has explained that disparity measuring section 103 measures the disparity in two stages, i.e., the pixel disparity measuring process and the sub-pixel disparity measuring process, the claimed invention is not limited to this, and a single stage only with the pixel disparity measuring process may measure the disparity. Even when the disparity measuring process is omitted in this way, the accuracy of detecting sub-pixel disparity can be maintained since the present embodiment adjusts the blur in the preceding stage of the pixel disparity measuring process.

[Embodiment 2]

In Embodiment 2, a blur matching process is performed in sub-pixels in the subsequent stage of a pixel disparity measuring process and in the preceding stage of a sub-pixel disparity measuring process.

[Configuration of Stereo Ranging Apparatus 400]

Figure 9:
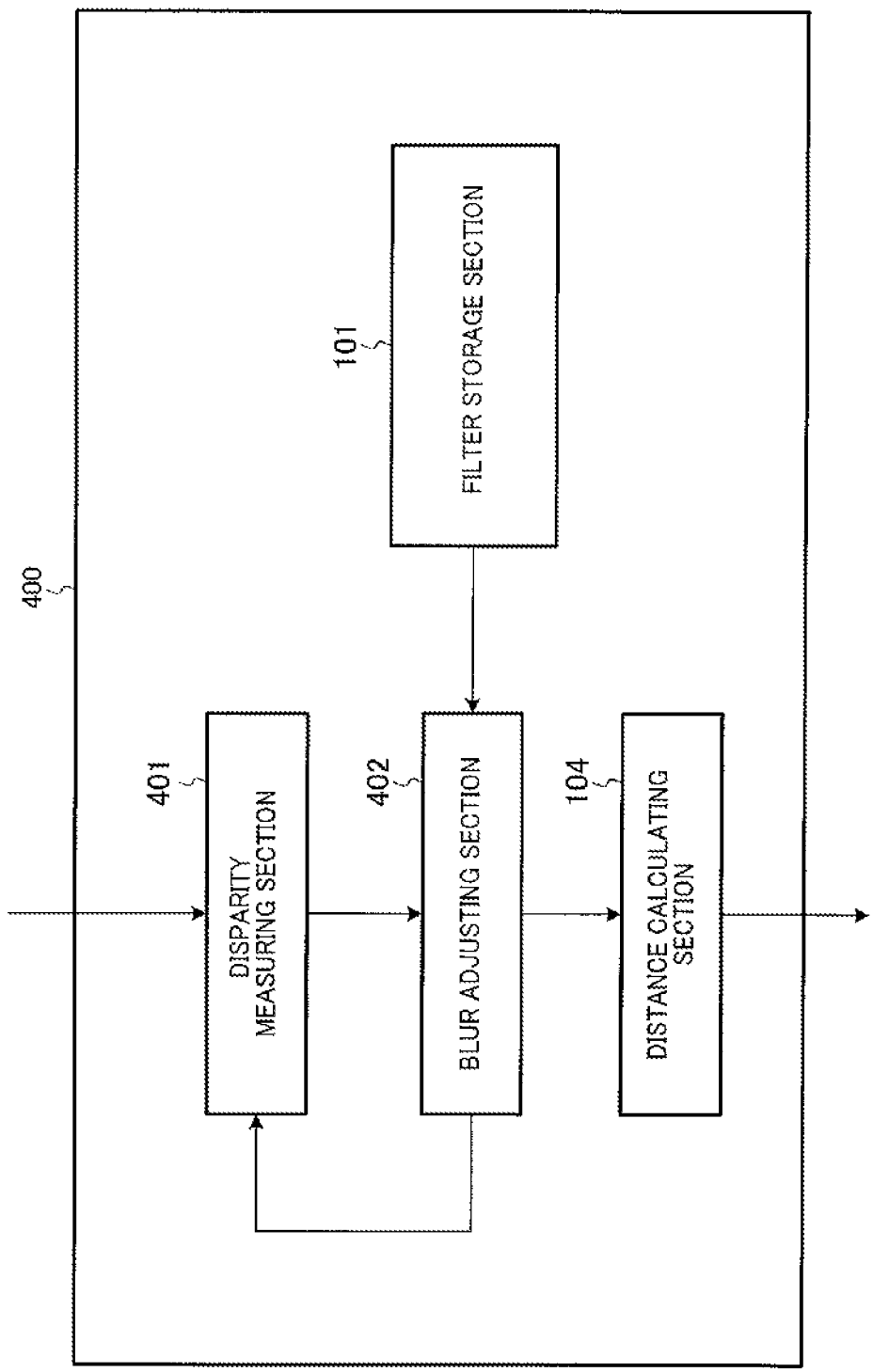
FIG. 9 is a block diagram showing a configuration of a stereo ranging apparatus according to Embodiment 2 of the claimed invention.

FIG. 9 is a block diagram showing a configuration of stereo ranging apparatus 400 according to Embodiment 2 of the claimed invention. In FIG. 9, stereo ranging apparatus 400 includes disparity measuring section 401 and blur adjusting section 402.

Disparity measuring section 401 basically has the same function as disparity measuring section 103 of Embodiment 1. Blur adjusting section 402 also has the same function as blur adjusting section 102 of Embodiment 1. However, the timing when the blur matching process is performed differs from that of Embodiment 1 as described above.

[Operation of Stereo Ranging Apparatus 400]

Figure 10:
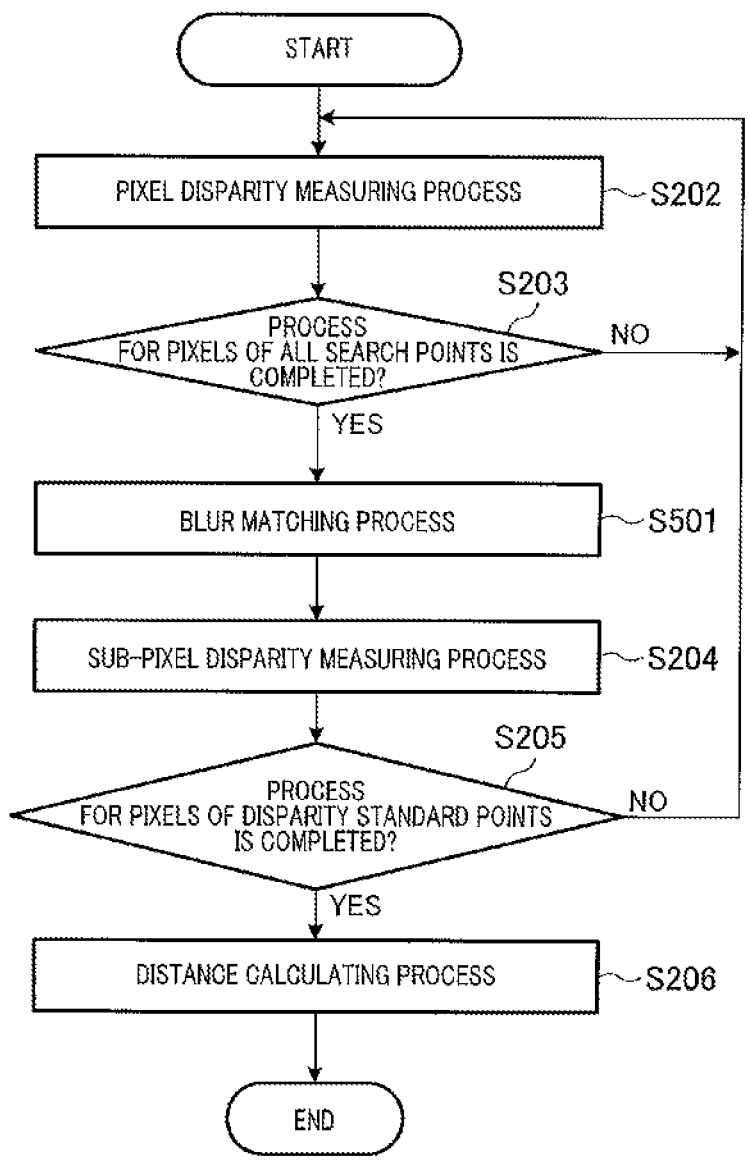
FIG. 10 is a flowchart to explain the operation of the stereo ranging apparatus.

FIG. 10 is a flowchart to explain the operation of stereo ranging apparatus 400.

As shown in FIG. 10, stereo ranging apparatus 400 performs the pixel disparity measuring process regardless of the blur matching process (step S202 and step S203). In other words, a corresponding point corresponding to the standard, point is selected in this stage.

In step S501, blur adjusting section 402 matches the blurs of the standard point of a standard image and the corresponding point of a reference image. In other words, in Embodiment 2, the target of the blur matching process is narrowed to a pair of the standard point and the corresponding point, which makes it possible to reduce load compared to Embodiment 1 where the blur matching process is performed on all the respective search points in the search range. As a result, a faster ranging process can be achieved.

in step S204, disparity measuring section 401 performs a pixel disparity measuring process using the standard point and the corresponding point with the adjusted blurs.

According to the present embodiment, in stereo ranging apparatus 400, blur adjusting section 402 adjusts blur in sub-pixels in the subsequent stage of the pixel disparity measuring process and in the preceding stage of the sub-pixel disparity measuring process. By this means, a faster ranging process can be achieved.

[Embodiment 3]

In Embodiment 3, a blur matching process is performed before a disparity measuring process is started.

[Configuration of Stereo Ranging Apparatus 600]

Figure 11:
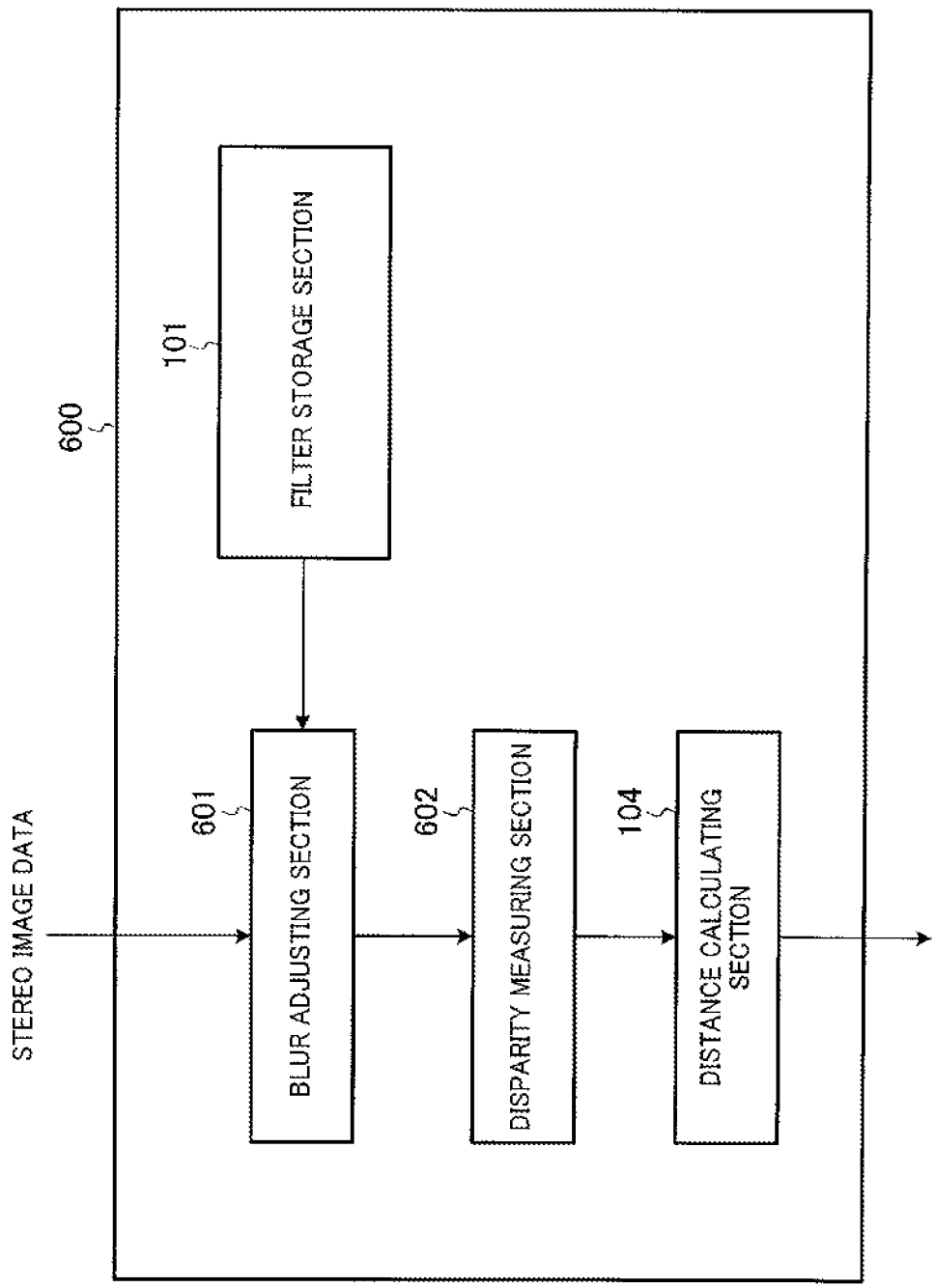
FIG. 11 is a block diagram showing a configuration of a stereo ranging apparatus according to Embodiment 3 of the claimed invention.

FIG. 11 is a block diagram showing a configuration of stereo ranging apparatus 600 according to Embodiment 3 of the claimed invention. In FIG. 11, stereo ranging apparatus 600 includes blur adjusting section 601 and disparity measuring section 602.

Blur adjusting section 601 basically has the same function as disparity measuring section 103 of Embodiment 1. However, blur adjusting section 601 matches the entire blur of one image that differs from the other image including the most blurred point, to the blur of the most: blurred point in the standard image or the reference image. Thus, filter storage section 101 holds a filter to correct the entire amplitude characteristics once.

Disparity measuring section 602 has the same function as blur adjusting section 102 of Embodiment 1. However, the timing when the blur matching process is performed differs from that of Embodiment 1 as described above.

[Operation of Stereo Ranging Apparatus 600]

Figure 12:
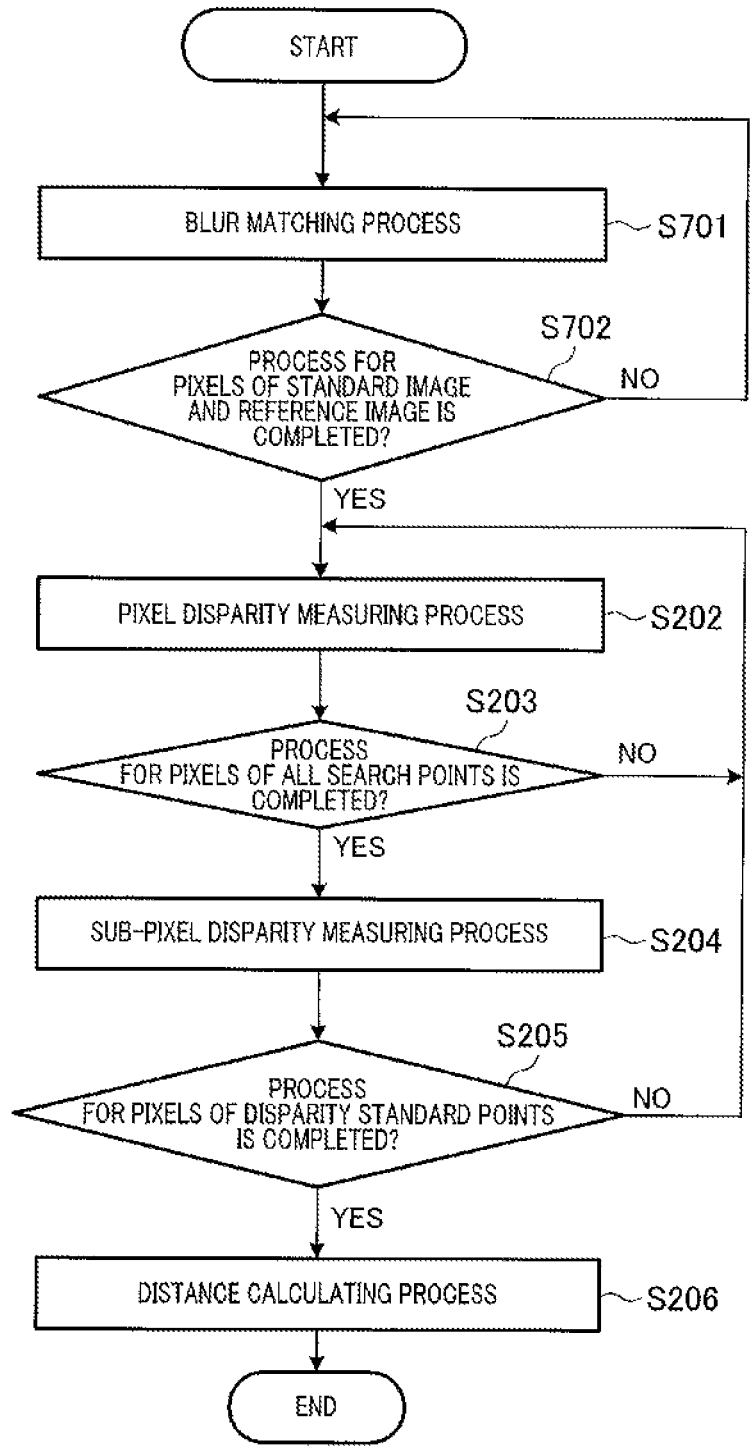
FIG. 12 is a flowchart to explain the operation of the stereo ranging apparatus.

FIG. 12 is a flowchart to explain the operation of stereo ranging apparatus 600.

Blur adjusting section 601 first specifies the most blurred point in the standard image and the reference image.

In step S701, blur adjusting section 601 acquires the blur adjusting filter coefficient, which corresponds to the most blurred point, from filter storage section 101, and also adjusts the blur of the target point in the other target image that differs from the image including the most blurred point, using the acquired blur adjusting filter coefficient.

In step S702, blur adjusting section 601 determines whether or not the blur matching process is completed for all the candidate target points in the image targeted for the process.

According to the present embodiment, in stereo ranging apparatus 600, blur adjusting section 601 collectively adjusts the blur for the entire standard image or the entire reference image, before disparity measuring section 602 starts the disparity measuring process. By this means, a faster ranging process can be achieved.

[Embodiment 4]

In Embodiment 4, a blur adjusting filter coefficient is calculated on a case-by-case basis.

[Configuration of Stereo Ranging Apparatus 800]

Figure 13:
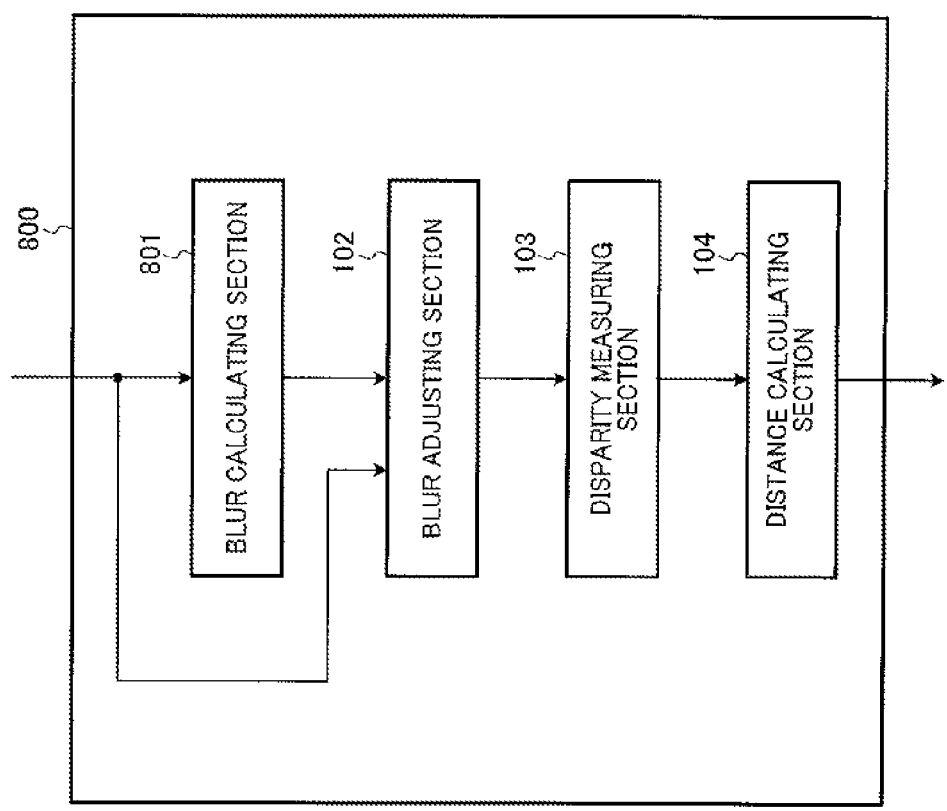
FIG. 13 is a block diagram showing a configuration of a stereo ranging apparatus according to Embodiment 4 of the claimed invention.

FIG. 13 is a block diagram showing a configuration of stereo ranging apparatus 800 according to Embodiment 4 of the claimed invention. In FIG. 13, stereo ranging apparatus 800 includes blur calculating section 801.

Blur calculating section 801 calculates a blur adjusting filter coefficient. The calculated blur adjusting filter coefficient is outputted to blur adjusting section 102.

[Operation of Stereo Ranging Apparatus 800]

Figure 14:
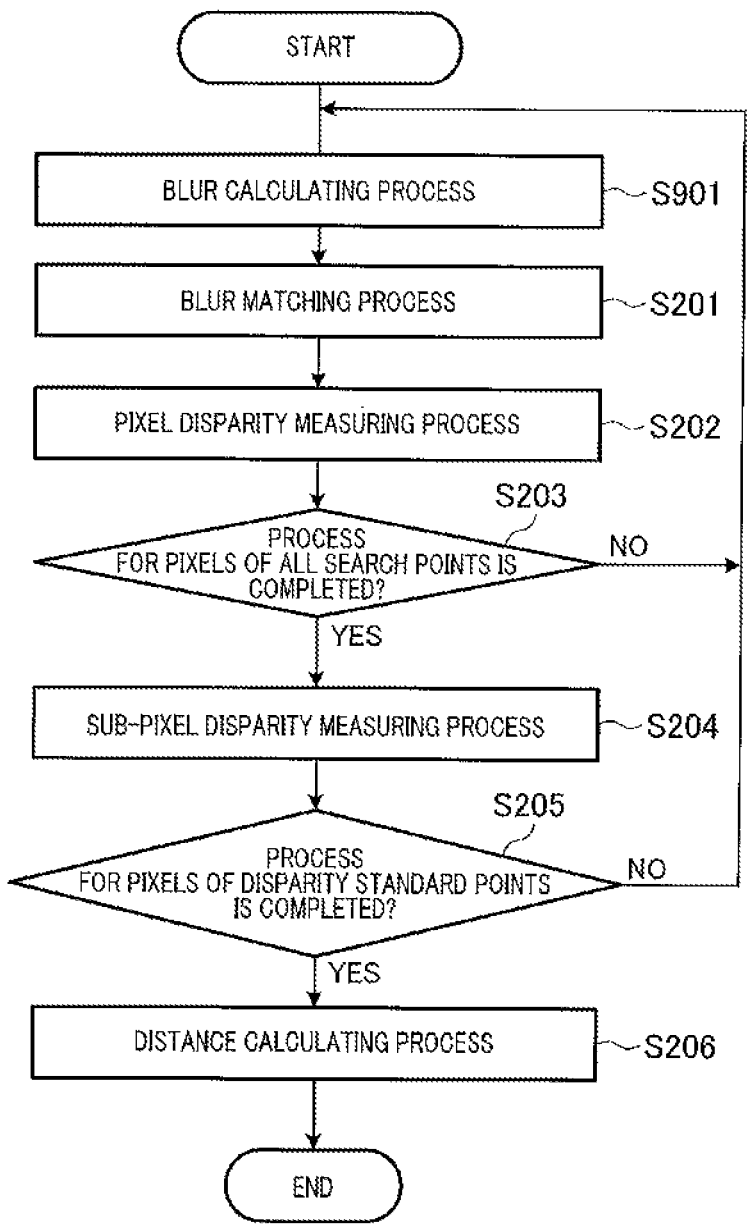
FIG. 14 is a flowchart to explain the operation of the stereo ranging apparatus.

FIG. 14 is a flowchart to explain the operation of stereo ranging apparatus 800.

in step S901, blur calculating section 801 receives, as input, stereo image data and calculates the blur adjusting filter coefficient using the stereo image data.

Figure 15:
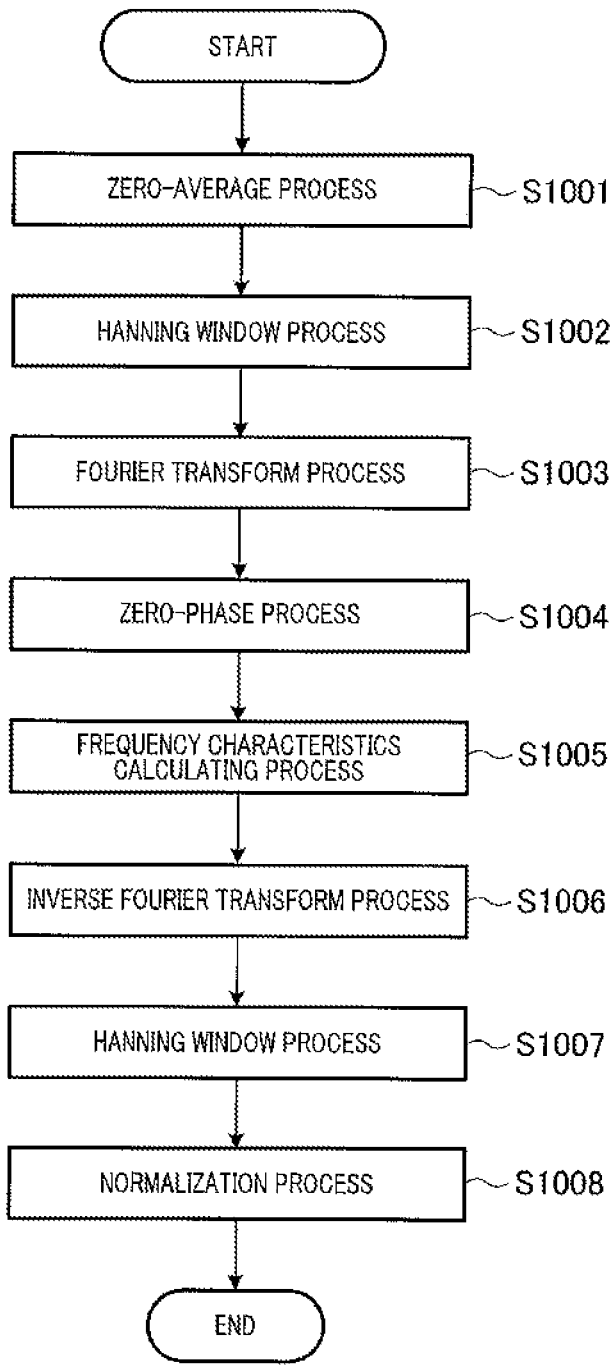
FIG. 15 is a flowchart to explain a process for calculating the blur adjusting filter coefficient.

FIG. 15 shows a flowchart to explain a process for calculating the blur adjusting filter coefficient.

Blur calculating section 801 performs processes of steps S1001 to S1004 for the standard image and the reference image.

Specifically, in the standard image, blur calculating section 801 performs a zero-average process on image brightness signals in a small area with the disparity standard point as its center (step S1001), performs a Hanning window process on the signals subjected to the zero-average process (step S1002), converts the signals subjected to the Hanning window process by Fourier transform (step S1003), and performs a zero-phase process on the signals subjected to the Fourier transform (step S1004). By this means, the blur in the small area with the disparity standard point as its center is calculated.

In the reference image, blur calculating section 801 performs a zero-average process on image brightness signals in a small area with a search point as its center (step S1001), performs a Hanning window process on the signals subjected to the zero-average process (step S1002), converts the signals subjected to the Hanning window process by Fourier transform (step S1003), and performs a zero-phase process on the signals subjected to the Fourier transform (step S1004). By this means, the blur in the small area with the search point as its center is calculated.

In addition, based on the blurs at the disparity standard point and the search point, blur calculating section 801 performs a frequency characteristics calculating process (step S1005), performs an inverse Fourier transform process (step S1006), performs a Hanning window process (step S1007), and performs a normalization process (step S1008). By this means, the blur matching filter coefficient is calculated.

The above processes will now be explained in detail.

<Zero-Average Process: Step S1001>

Blur calculating section 801 converts the image brightness signals such that the average of all the signals becomes zero.

<Hanning Window Process: Step S1002>

Blur calculating section 801 calculates window function w(x) based on following equation 3, and overlaps the calculated window function on the brightness signals.

[3]

$$w(x) = 0.5 - 0.5 \times \cos(2\pi x/N) \quad \text{(Equation 3)}$$

where "N" represents the number of samples of the brightness signals.

The zero-average process (step S1001) and the Hanning window process (step S1002) are the preprocessing required to robustly derive the frequency characteristics calculated in the Fourier transform process (step S1003) in the subsequent stage, and can be substituted for by the preprocessing, such as other general window process or the like.

<Fourier Transform Process: Step S1003>

Blur calculating section 801 performs Fourier transform on the brightness signals calculated by the Hanning window process.

<Zero-Phase Process: Step S1004>

Blur calculating section 801 sets the phase components of the frequency characteristics derived in the Fourier transform process as zero, and calculates the square root of the square sum of the amplitude components and the phase components as the amplitude characteristics. This zero-phase process is the postprocessing to robustly calculate the amplitude characteristics.

<Frequency Characteristics Calculating Process: Step S1005>

Blur calculating section 801 calculates the difference of the amplitude characteristics (hereinafter, referred to as "amplitude characteristics difference"). Specifically, the amplitude characteristics difference is calculated as the quotient between the amplitude characteristics in each spatial frequency. On the one hand, when the image height of the disparity standard point is smaller than the image height of the search point, amplitude characteristics difference H(u) is calculated as G(u)/F(u) where "u" represents certain spatial frequency, "F(u)" represents the amplitude characteristics at the disparity standard point, and "G(u)" represents the amplitude characteristics at the search point. On the other hand, when the image height of the disparity standard point is larger than the image height of the search point, amplitude characteristics difference H(u) is calculated as F(u)/G(u).

Although the present embodiment explains that the relationship of the quotient is determined depending on the sizes of the image height, the claimed invention is not limited to this, and the relationship of the quotient may be determined depending on the magnitude of the amplitude characteristics value.

<Inverse Fourier Transform Process: Step S1006>

Blur calculating section 801 performs an inverse Fourier transform on amplitude characteristics difference H(u).

<Hanning Window Process: Step S1007>

Blur calculating section 801 overlaps the Hanning window calculated as step S1002 on amplitude characteristics difference H(u) subjected to the inverse Fourier transformation. In other words, the Hanning window process is performed as the postprocessing of the inverse Fourier transform process. Thus, high frequency components amplitude characteristics difference h(x) calculated by the inverse Fourier transform process (step S1006) can be deleted.

<Normalization Process: Step S1008>

Blur calculating section 801 normalizes amplitude characteristics difference h(x) calculated by the Hanning window process (step S1007) so as to obtain 1 through addition of amplitude characteristics differences h(x). This normalization is performed in order to prevent a change in the image brightness value when the normalized values are applied as a spatial filter.

The above calculated blur adjusting filter coefficient is outputted to blur adjusting section 102 and is used for the blur matching process in blur adjusting section 102.

In the above explanation, the configuration of stereo ranging apparatus 100 according to Embodiment 1, which applies blur calculating section 801 instead of filter storage section 101, is defined as the configuration of stereo ranging apparatus 800. In the same way, the configuration of stereo ranging apparatus 400 according to Embodiment 2 may apply blur calculating section 801 instead of filter storage section 101, and the configuration of stereo ranging apparatus 600 according to Embodiment 3 may apply blur calculating section 801 instead of filter storage section 101.

[Other Embodiments]

(1) Although Embodiments 1 to 4 do not especially mention whether cameras (or lenses) of forming a stereo camera are arranged in parallel or non-parallel, the claimed invention is not limited by the installation mode of the stereo camera. In other words, the claimed invention is applicable when the blur due to spherical aberration causes the difference between the blurs of images forming a stereo image. The case of nonparallel arrangement enlarges the difference of the blurs, which makes it possible to acquires remarkable effect.

(2) Embodiments 1 and 2 have explained that a blur adjusting process is performed on all the disparity standard points sequentially changed in the standard image. However, the claimed invention is not limited to this, and the blur adjusting process may be performed only for a specific candidate of the disparity standard point. Specifically, a process necessity determining section may be provided in stereo ranging apparatus 100 (400), and then blur adjusting section 102 (402) may perform the blur matching process only when the process necessity determining section determines that the standard point, which is the current target, is the specific candidate of the disparity standard point. Consequently, the blur matching process can be performed only in the area that requires precise ranging, and thus the processing time can be reduced. For example, the specific candidate of the disparity standard point is predefined depending on an application. For example, in the case of the application related to an onboard camera for monitoring the front direction, the area that requires precise ranging, such as a center area in front of a vehicle, is the specific candidate of the disparity standard point.

(3) In the above embodiments, a case has been explained by way of example in which the claimed invention is configured as hardware, but it is also possible for the claimed invention to be implemented by means of software in conjunction with hardware.

Each function block employed in the description of each of the aforementioned embodiments may typically be implemented as an LSI constituted by an integrated circuit. These may be individual chips or partially or totally contained on a single chip. The term "LSI" is adopted herein but this may also be referred to as "IC," "system LSI," "super LSI," or "ultra LSI" depending on differing extents of integration.

Furthermore, the method of circuit integration is not limited to LSI's, and implementation using dedicated circuitry or general purpose processors is also possible. After LSI manufacture, utilization of a programmable field programmable gate array (FPGA) or a reconfigurable processor where connections and settings of circuit cells within an LSI can be reconfigured is also possible.

Furthermore, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2010-165008, filed on Jul. 22, 2010, including the specification, drawings and abstract, is incorporated herein by reference in its entirety.

INDUSTRIAL APPLICABILITY

A stereo ranging apparatus and method of stereo ranging of the claimed invention are useful to involve blur correction through adjustment of camera images and thus to prevent extension of the time for a ranging process while improving the accuracy of disparity detection.

REFERENCE SIGNS LIST 100, 400, 600, 800 Stereo ranging apparatus
101 Filter storage section
102, 402, 601 Blur adjusting section
103, 401, 602 Disparity measuring section
104 Distance calculating section
111 Blur adjusting filter acquiring section
112 Filter applying image determining section
113 Filter applying section
801 Blur calculating section

The invention claimed is:

1. A stereo ranging apparatus that calculates the distance to a target using a first image and a second image of the target, the apparatus comprising a processor having one or more integrated circuits configured to:
   store blur adjusting filter coefficients corresponding to combinations of image heights of the first image and image heights of the second image;
   compare an image height of a first partial image which is an image of the target in the first image and an image height of a second partial image which is a candidate for an image of the target in the second image;
   acquire a blur adjusting filter coefficient that corresponds to a combination of the image height of the first partial image and the image height of the second partial image from the filter storage section;
   adjust the blur of one partial image with the lower image height of the first partial image and the second partial image to the blur of the other partial image with the higher image height, using the acquired blur adjusting filter coefficient;
   determine whether the second partial image is the image of the target in the second image based on the partial image with the adjusted blur and the partial image with the unadjusted blur;
   measure disparity between the first partial image and the second partial image when the second partial image is the image of the target in the second image; and
   calculate the distance to the target based on the disparity.

2. The stereo ranging apparatus according to claim 1 wherein the blur includes amplitude characteristics of brightness signals of an image.

3. The stereo ranging apparatus according to claim 1, wherein:
   the disparity is measured only in a single stage of a pixel disparity measuring process, or in two stages of the pixel disparity measuring process and a sub-pixel disparity measuring process; and
   the blur is adjusted before the pixel disparity measuring process.

4. The stereo ranging apparatus according to claim 1, wherein:
   the disparity is measured in two stages of a pixel disparity measuring process and a sub-pixel disparity measuring process; and
   the blur is adjusted in a subsequent stage of the pixel disparity measuring process and in a preceding stage of the sub-pixel disparity measuring process.

5. The stereo ranging apparatus according to claim 1, wherein the blur of the entire first image or the entire second image is adjusted before measuring the disparity.

6. A method of stereo ranging that calculates a distance to a target using a first image and a second image, comprising the steps of:
- comparing an image height of a first partial image which is an image of the target in the first image and an image height of a second partial image which is a candidate for an image of the target in the second image;
- acquiring a blur adjusting filter coefficient that corresponds to a combination of the image height of the first partial image and the image height of the second partial image, from a correspondence stored between blur adjusting filter coefficients and combinations of image heights of the first image and image heights of the second image;
- adjusting the blur of one partial image with the lower image height of the first partial image and the second partial image to the blur of the other partial image with the higher image height, using the acquired blur adjusting filter coefficient;
- determining whether the second partial image is the image of the target in the second image based on the partial image with the adjusted blur and the partial image with the unadjusted blur;
- measuring disparity between the first partial image and the second partial image when the second partial image is the image of the target in the second image; and
- calculating the distance to the target based on the disparity.

* * * * *